United States Patent [19]
Sato et al.

[11] Patent Number: 6,031,476
[45] Date of Patent: Feb. 29, 2000

[54] DIGITAL TO ANALOG CONVERTER WITH CURRENT SUPPLY FOR SUPPRESSING CURRENT DURING A SYNCHRONIZATION SIGNAL

[75] Inventors: Yasushi Sato; Naoki Kumazawa, both of Kanagawa, Japan

[73] Assignee: Sony Corporation, Tokyo, Japan

[21] Appl. No.: 08/847,748

[22] Filed: Apr. 22, 1997

[30] Foreign Application Priority Data

Apr. 24, 1996 [JP] Japan ..................................... 8-126285

[51] Int. Cl.[7] ...................................................... H03M 1/66
[52] U.S. Cl. ............................................................ 341/144
[58] Field of Search ..................................... 348/625, 678, 348/712, 524; 386/7; 327/312; 341/144

[56] References Cited

U.S. PATENT DOCUMENTS

| | | | |
|---|---|---|---|
| 4,516,042 | 5/1985 | Nakamura | 327/312 |
| 5,486,868 | 1/1996 | Shyu et al. | 348/524 |
| 5,608,532 | 3/1997 | Park | 386/7 |

*Primary Examiner*—Michael Tokar
*Assistant Examiner*—Patrick Wamsley
*Attorney, Agent, or Firm*—Frommer Lawrence & Haug, LLP; William S. Frommer

[57] ABSTRACT

The present invention provides an 8-bit D/A converter comprising a first current supply for outputting a current representing input digital luminance signal data and a second current supply for outputting a predetermined current except during pulse periods of a synchronization signal Sync supplied along with the digital luminance signal data wherein the sum of the current generated by the first current supply in accordance with the digital luminance signal data and the predetermined current generated by the second current supply in accordance with the synchronization signal Sync is output.

Consequently an analog luminance signal from a D/A converter with a tone expression thereof improved by effectively utilizing the dynamic range of the D/A converter is obtained.

5 Claims, 7 Drawing Sheets

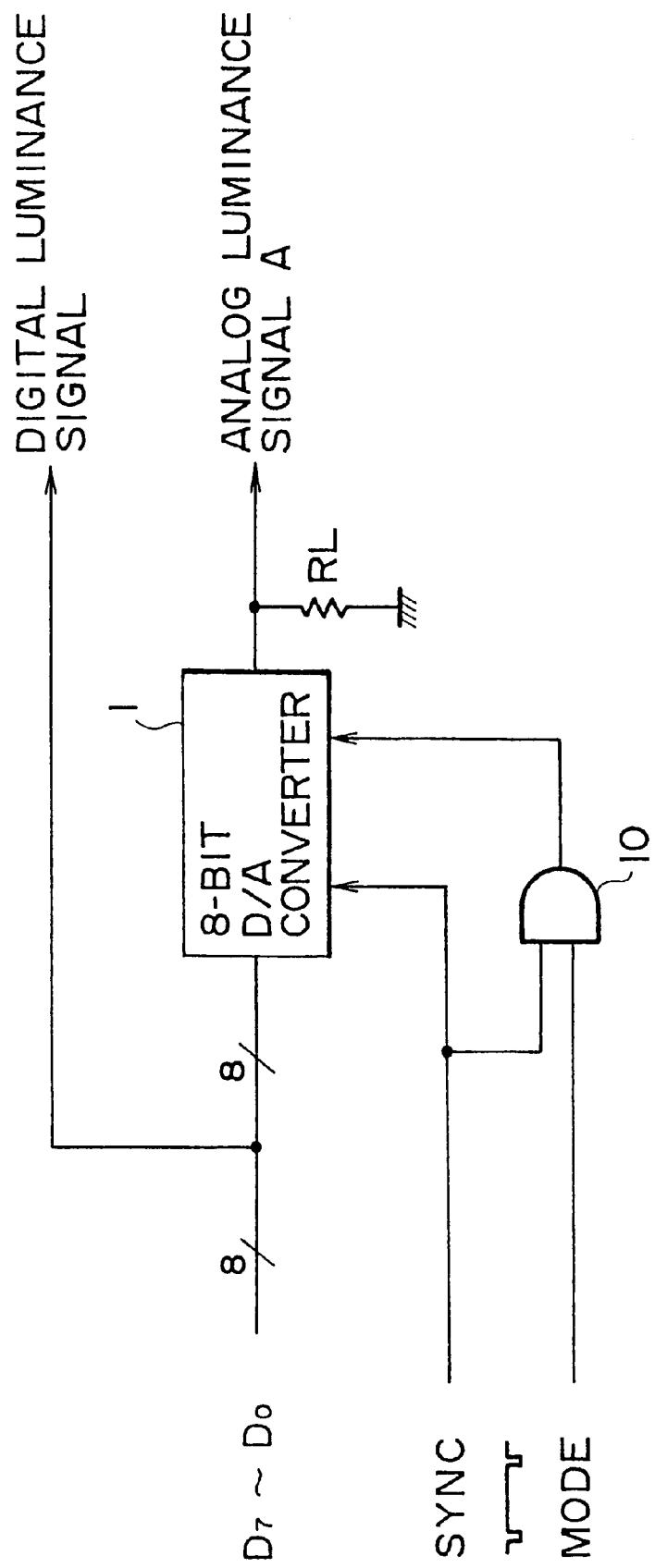

SYNCHRONIZATION SIGNAL : LUMINANCE SIGNAL = 1 : 3

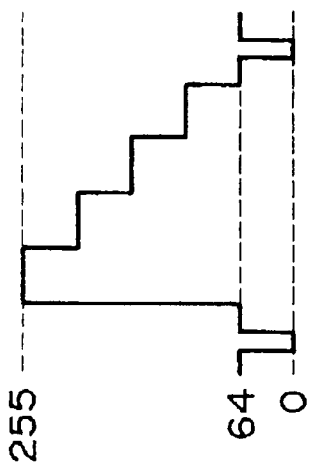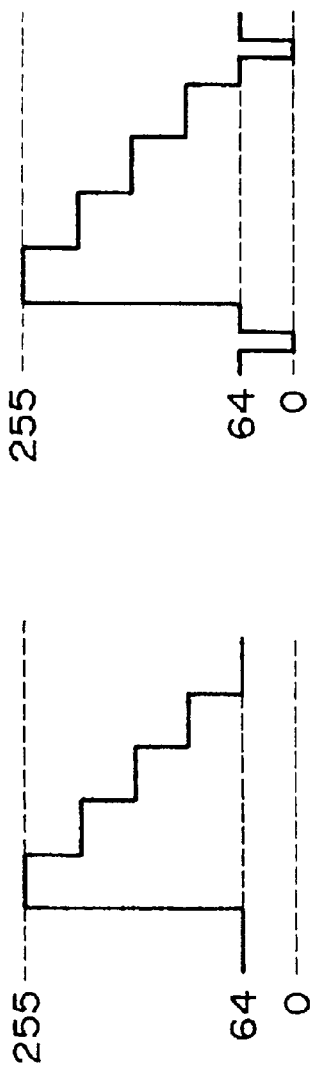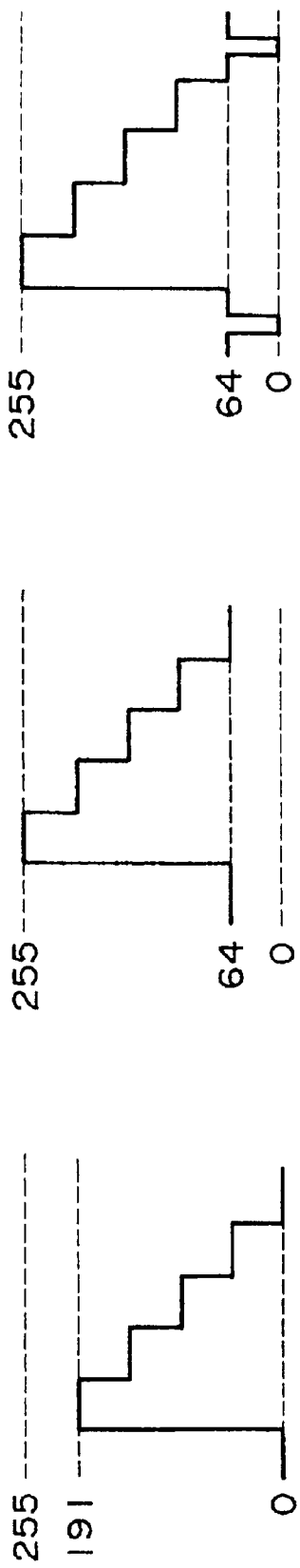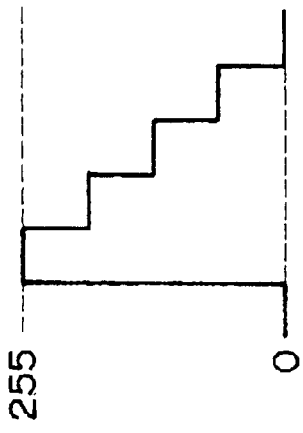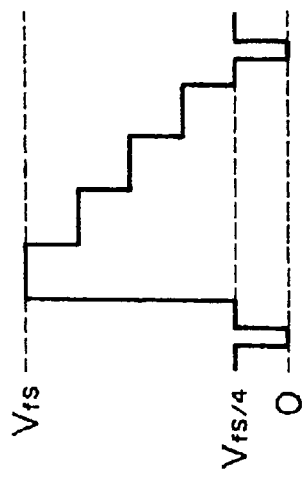
FIG. 7A (Prior Art)
FIG. 7B (Prior Art)
FIG. 7C (Prior Art)
FIG. 7D (Prior Art)
FIG. 7E (Prior Art)

6,031,476

1

DIGITAL TO ANALOG CONVERTER WITH CURRENT SUPPLY FOR SUPPRESSING CURRENT DURING A SYNCHRONIZATION SIGNAL

BACKGROUND OF THE INVENTION

The present invention relates in general to a D/A converter and in particular to a D/A converter that can be used well in a digital video camera apparatus or the like.

In general equipment such as a digital video camera apparatus, digital video signal data may be output as an analog video signal. In this case, the digital video camera apparatus may employ a D/A converter for converting digital luminance signal data of the digital video signal into an analog luminance signal in addition to a D/A converter for converting digital chrominance signal data into an analog chrominance signal.

FIG. 6 is a diagram showing a typical conventional 8-bit D/A converter and a peripheral circuit thereof. The conventional 8-bit D/A converter is used for converting digital luminance signal data output by a video camera apparatus into an analog luminance signal.

The conventional 8-bit D/A converter 100 shown in the figure is a current-output D/A converter for outputting a current representing digital data supplied thereto. The current output by the D/A converter 100 is converted into a voltage by using a resistor RL. In this way, the D/A converter 100 outputs an analog signal with a level representing digital data supplied thereto.

The digital data supplied to the D/A converter is typically 8 bits in width. From the 8-bit digital data, an analog luminance signal A having 256 tones representing the luminance signal data can be obtained.

By the way, when an analog luminance signal A is output from the 8-bit D/A converter 100 described above, it is necessary to add a synchronization signal Sync to the analog luminance signal A. In general, however, luminance signal data input from a block at a stage before the video camera apparatus or the like does not have a synchronization signal Sync added thereto. For this reason, a selector 102 and an adder 101 for adding a synchronization signal to the luminance signal data are provided on the input side of the 8-bit D/A converter 100. It should be noted that the block for generating the luminance signal data is not shown in the figure.

The adder 101 adds typically an offset of 64 for allowing for the synchronization-signal component to the input luminance signal data, outputting the result of the addition to a selector 102. The selector 102 has an input pin a for receiving the result of the addition from the adder 101 and an input pin b connected to the ground. The output of the selector 102 is switched from the input pin a to the input b or vice versa with timing determined by the synchronization signal Sync. In this way, the synchronization signal Sync is added to the sum of the luminance signal data and the offset value 64.

In order to supply 8-bit luminance signal data with a synchronization signal Sync added thereto to the conventional 8-bit D/A converter 100 in a circuit described above, a block at a front stage not shown in the figure provides the adder 101 with a digital value having tone levels 0 to 191 shown in FIG. 7A as luminance signal data. As described above, the adder 101 adds the offset value 64 to the luminance signal data to output digital data including luminance signal data with tone levels 64 to 255 shown in FIG. 7B to

2 the selector 102. The selector 102 is switched from the input pin a to the input b or vice versa with timing determined by the synchronization signal Sync. As a result, luminance signal data with the synchronization signal Sync added at tone levels 0 to 64 as shown in FIG. 7C is supplied to the 8-bit D/A converter 100.

The luminance signal data with the synchronization signal Sync added thereto is supplied to the 8-bit D/A converter 100 for converting the luminance signal data into a current which appears as a voltage between the ends of the resistor RL. The voltage is the analog luminance signal A with a level ratio of 3:1 as shown in FIG. 7C where the level ratio is a ratio of the luminance-signal level to the synchronization-signal level.

As shown in FIG. 6, the digital luminance signal data is also supplied to a multiplier 104 for multiplying the digital luminance signal data by 4/3. That is to say, the multiplier 104 converts the luminance signal data with tone levels 0 to 191 shown in FIG. 7A into 8-bit luminance signal data at a full scale with tone levels 0 to 255 shown in FIG. 7E. The multiplier 104 then supplies the multiplied digital luminance signal data including no synchronization signal Sync to other equipment.

In spite of the fact that the digital luminance signal data supplied to the 8-bit D/A converter 100 along with the synchronization signal Sync added thereto is 8 bits in width, the digital value assigned to the luminance signal data is in a range of only 64 to 255. That is to say, the entire dynamic range 0 to 255 of the 8-bit D/A converter 100 can not be allocated fully to the digital luminance signal data.

As a result, the tone expression of the analog luminance signal output by the 8-bit D/A converter 100 is rough in comparison with a 8-bit D/A converter 100 with its entire dynamic range fully utilized, giving rise to a problem of a degraded picture quality.

In addition, there is also encountered another problem that the selector 102 and the adder 101 are required as peripheral components of the 8-bit D/A converter 100 for adding the synchronization signal Sync to the luminance signal data and, if the luminance signal data needs to be output as digital data as it is, the multiplier 104 is also required for converting the original luminance signal data into an 8-bit luminance signal at a full scale in the range 0 to 255.

SUMMARY OF THE INVENTION

The present invention addresses the problems described above. It is thus an object of the present invention to provide a D/A converter which is capable of outputting an analog luminance signal with an enhanced tone expression through the effective use of the dynamic range thereof.

In order to achieve the object described above, the present invention provides a D/A converter comprising:

a first current supply for outputting a current representing input digital video signal data; and a second current supply for outputting a predetermined current except during pulse periods of a synchronization signal supplied along with said digital video signal data, said D/A converter characterized in that the sum of said current generated by said first current supply and said predetermined current generated by said second current supply is output.

The ratio of a maximum current output by said first current supply to said predetermined current output by said second current supply is set at 3:1.

Said D/A converter further comprises a third current supply which is used for outputting a predetermined current except during pulse periods of said synchronization signal in accordance with an input mode signal.

The ratio of said predetermined current output by said third current supply to said predetermined current output by said second current supply is set at 0.075:1.

According to an aspect of the present invention, desired direct-current offset data is added to said digital video signal data during said pulse periods of said synchronization signal.

According to the present invention, since the D/A converter comprises a first current supply for outputting a current representing input digital video signal data and a second current supply for outputting a predetermined current except during pulse periods of a synchronization signal supplied along with the digital video signal data, the entire dynamic range of the D/A converter can be allocated to the digital video signal data.

In addition, since the D/A converter further comprises a third current supply which is used for outputting a predetermined current except during pulse periods of the synchronization signal in accordance with an input mode signal, it is possible to output an analog luminance signal for the PAL system.

BRIEF DESCRIPTION OF THE DRAWINGS

FIG. 1 is a diagram showing an 8-bit D/A converter and a peripheral circuit thereof as implemented by a first embodiment of the present invention;

FIG. 7 is a diagram showing the waveforms of signals appearing at various components of the conventional 8-bit D/A converter.

DETAILED DESCRIPTION OF THE PREFERRED EMBODIMENTS

The present invention will become apparent from the following detailed description of preferred embodiments with reference to accompanying diagrams showing the embodiments.

FIG. 1 is a diagram showing an 8-bit D/A converter and a peripheral circuit thereof as implemented by a first embodiment of the present invention.

Figure 2A:
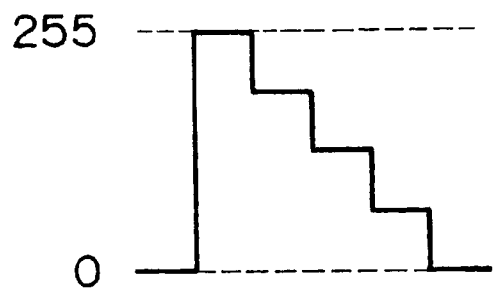
FIG. 2 is a diagram showing signals input to and output by the 8-bit D/A converter implemented by the first embodiment of the present invention.
Figure 2B:
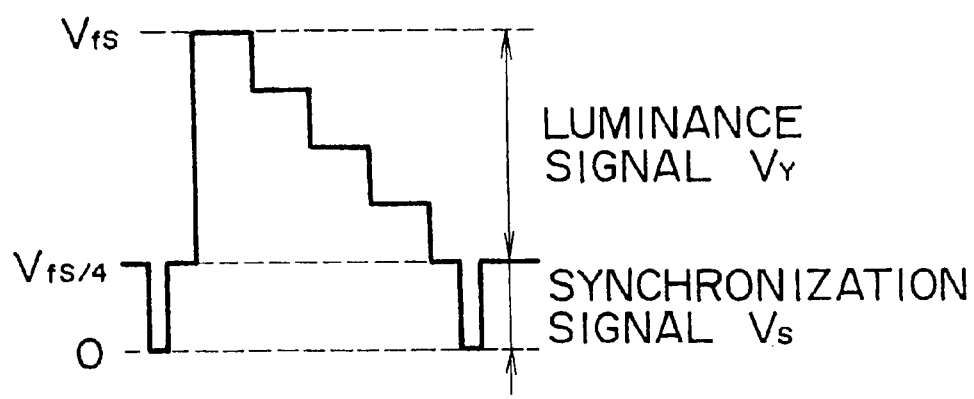

The 8-bit D/A converter 1 shown in the figure is a D/A converter capable of outputting a current representing input digital luminance signal data $D_7$ to $D_0$ and a synchronization signal Sync, a horizontal or vertical synchronization signal. The 8-bit D/A converter 1 inputs the synchronization signal Sync and 8-bit luminance signal data $D_0$ to $D_7$ at a full scale having a value in the range 0 to 255 as shown in FIG. 2A. The current output by the 8-bit D/A converter is converted by a resistor RL into a voltage representing an analog luminance signal A which comprises a synchronization-signal level $V_S$ and a luminance-signal level $V_Y$ at a ratio $(V_S/V_Y)$ of 1:3 as shown in FIG. 2B.

The synchronization signal Sync is supplied to one of the inputs of an AND circuit 10 and a mode signal Mode is fed to the other input thereof. As will be described later, a signal output by the AND circuit 10 representing a mode signal Mode is supplied to the 8-bit D/A converter 1. In this way, the 8-bit D/A converter 1 can output an analog luminance signal A for the PAL or NTSC system.

Figure 3:
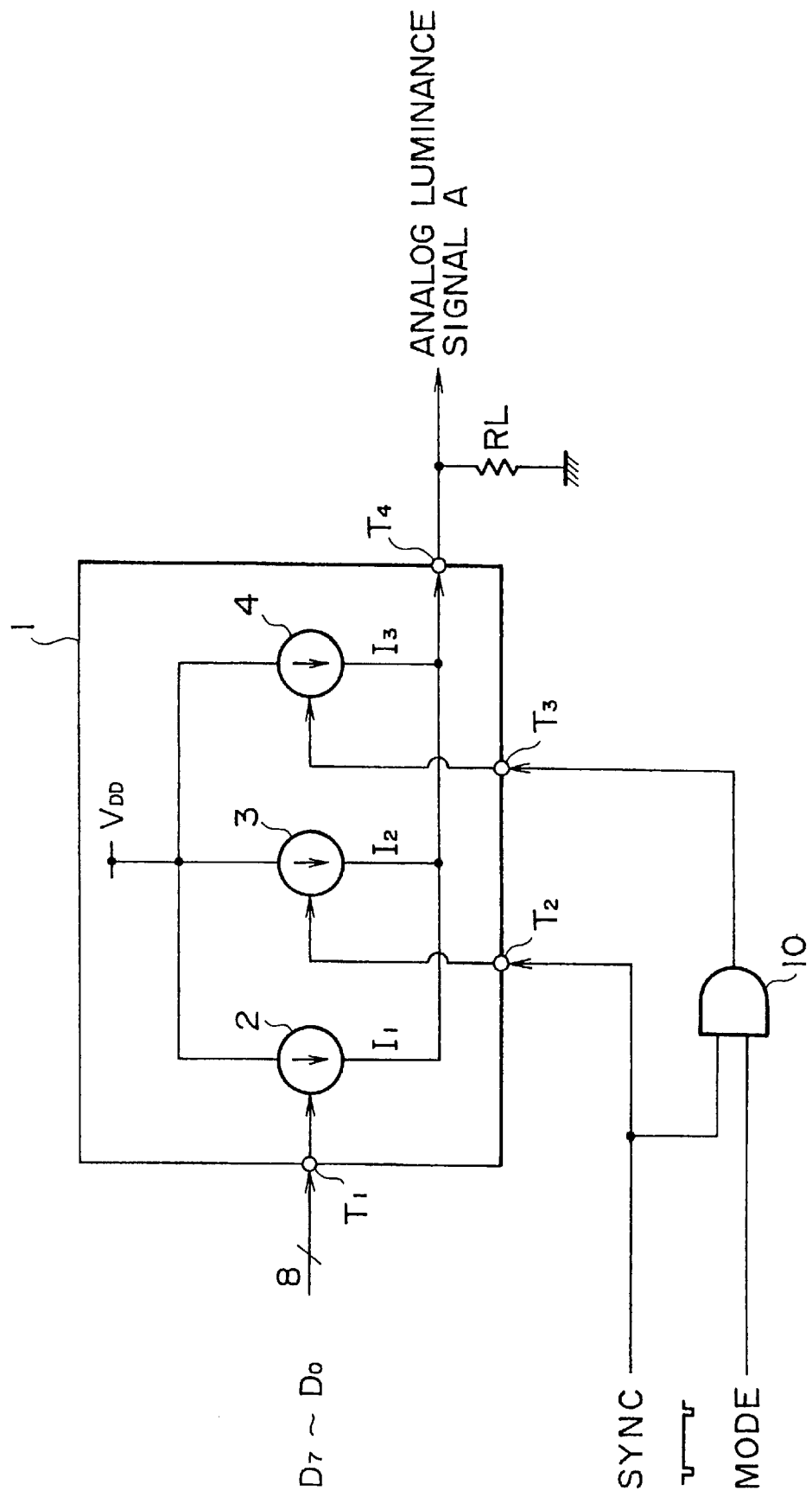
FIG. 3 is a block diagram showing the 8-bit D/A converter implemented by the first embodiment of the present invention.

The 8-bit D/A converter 1 is explained by referring to FIG. 3 showing a block diagram thereof as follows.

The D/A converter 1 implemented by the first embodiment shown in the figure comprises a first current supply 2, a second current supply 3 and a third current supply 4.

The first current supply 2 is a current supply for outputting a current representing the digital value of 8-bit luminance signal data $D_7$ to $D_0$ supplied to the first current supply 2 by way of a pin $T_1$. The first current supply 2 is typically a D/A converter of the R-2R current-addition type or the generally known current switching type wherein currents are added to each other while eight differently weighted current supplies are being switched from one to another in accordance with the luminance signal data $D_0$ to $D_7$. When the digital value of the luminance signal data $D_7$ to $D_0$ reaches its maximum of 255, the first current supply 2 outputs a current $I_1$.

The second current supply 3 is a current supply which is turned on and off by the synchronization signal Sync supplied to the second current supply 3 by way of a pin $T_2$. The second current supply 3 outputs a predetermined current $I_2$ except during pulse periods of the synchronization signal Sync.

The third current supply 4 is a current supply which is turned on and off by the output signal of the AND circuit 10 supplied to the 8-bit D/A converter 1 by way of a pin $T_3$. As will be described later, when the 8-bit D/A converter 1 is supposed to output an analog luminance signal for the PAL system as requested by the mode signal Mode supplied to the AND circuit 10, the third current supply 4 outputs a predetermined current $I_3$ except during the pulse periods of the synchronization signal Sync.

To sum up, the 8-bit D/A converter 1 implemented by the present embodiment comprises the first current supply 2 for outputting a current, an analog signal resulting from conversion of input digital luminance signal data $D_7$ to $D_0$, the second current supply 3 for outputting the predetermined current $I_2$ except during pulse periods of the synchronization signal Sync and the third current supply 4 for outputting the predetermined current $I_3$ except during the pulse periods of the synchronization signal Sync when the 8-bit D/A converter is supposed to output an analog luminance signal for the PAL system.

The operation of the 8-bit D/A converter 1 as implemented by the first embodiment of the present invention to output a current for the NTSC system is explained as follows.

It should be noted that, in order to output a current for the NTSC system, the mode signal Mode supplied to the AND circuit 10 is typically set at a "low" level. In this state, a signal output by the AND circuit 10 to the third current supply 4 by way of the pin $T_3$ is also set at the "low" level as well.

The 8-bit luminance signal data $D_7$ to $D_0$ is supplied to the first current supply 2 by way of the pin $T_1$. In turn, the first current supply 2 outputs a current representing the digital value of the 8-bit luminance signal data $D_7$ to $D_0$.

Typically, the 8-bit luminance signal data $D_7$ to $D_0$ is a tone signal having a value in the range 0 to 255. In this case, when the value of the tone represented by the luminance signal data is n, the first current supply 2 outputs a current $I_L$ given by the following equation:

$$I_L = I_1 \times n/255 \qquad (1)$$

where notation $I_1$ denotes a current corresponding to the maximum value 255 of the input signal.

The synchronization signal Sync is supplied to the second current supply 3 by way of the pin $T_2$. In turn, the second current supply 3 outputs the predetermined current $I_2$ except during the pulse periods of the synchronization signal Sync. That is to say, during the pulse periods of the synchronization signal Sync, the second current supply 3 is turned off.

By the way, a signal output by the AND circuit 10 to the third current supply 4 by way of the pin $T_3$ is also set at the "low" level, turning off the third current supply 4 as well.

That is to say, when the 8-bit D/A converter 1 is supposed to output an analog luminance signal for the NTSC system, the 8-bit D/A converter 1 works as follows. In a period with no pulse of the synchronization signal Sync supplied, the 8-bit D/A converter 1 outputs a current through a pin $T_4$ which is equal in magnitude to the sum of the current $I_L$, an analog signal resulting from conversion of the digital luminance signal data $D_7$ to $D_0$ by the first current supply 2, and the current $I_2$ output by the second current supply 3 to represent the synchronization signal Sync. The current output through the pin $T_4$ is converted into a voltage by the resistor RL. In a period with a pulse of the synchronization signal Sync supplied, on the other hand, the currents $I_L$ and $I_2$ output by the first and second current supplies 2 and 3 respectively are both zero. As a result, an analog luminance signal A with an added synchronization signal conforming to the NTSC system is output by the 8-bit D/A converter 1.

By the way, in order to convert the current output by the 8-bit D/A converter 1 into a voltage and to output an analog luminance signal conforming to the NTSC system, it is necessary to set the level ratio of a synchronization-signal level $V_S$ to a luminance-signal level $V_Y$ ($V_S/V_Y$) typically at 1:3 as shown in FIG. 2B and set the synchronization-signal level $V_S$ at 40 IRE.

In the 8-bit D/A converter 1 implemented by the present embodiment, a current ratio is set at 3:1 where the current ratio is defined as a ratio of the maximum current $I_L$ output by the first current supply 2 or a peak current of the luminance signal to the current $I_2$ output by the second current supply 3.

With the current ratio of the current output by the first current supply 2 to the current output by the second current supply 3 set at 3:1, the level $V_Y$ of the luminance signal corresponding to the maximum current $I_1$ output by the first current supply 2 is given by the following equation:

$$V_Y = R \times 3 \times I_2 \qquad (2)$$

where notation R denotes the resistance of the resistor RL.

The level $V_S$ of the synchronization signal corresponding to the current $I_2$ output by the second current supply 3 is given by the following equation:

$$V_S = R \times I_2 \qquad (3)$$

As a result, the analog luminance signal A output by the 8-bit D/A converter 1 comprises a synchronization signal $V_S$ and a luminance signal $V_Y$ with their levels set at a ratio ($V_S V_Y$) of 1:3.

In order to set the synchronization-signal level $V_S$ added to the analog luminance signal A at 40 IRE, the current $I_2$ output by the second current supply 3 is set at a fraction of the maximum current $I_1$ output by the first current supply 2 as described above.

Since the 8-bit D/A converter 1 implemented by the present embodiment comprises the first current supply 2 for outputting a current, an analog signal resulting from conversion of input digital luminance signal data $D_7$ to $D_0$, and the second current supply 3 for outputting the predetermined current $I_2$ except during pulse periods of the synchronization signal Sync, digital luminance signal data $D_7$ to $D_0$ corresponding to the full dynamic range 0 to 255 of the 8-bit D/A converter 1 can be input, allowing the tone expression of the analog luminance signal output by the 8-bit D/A converter 1 along with the additional synchronization signal to be enhanced.

Figure 6:
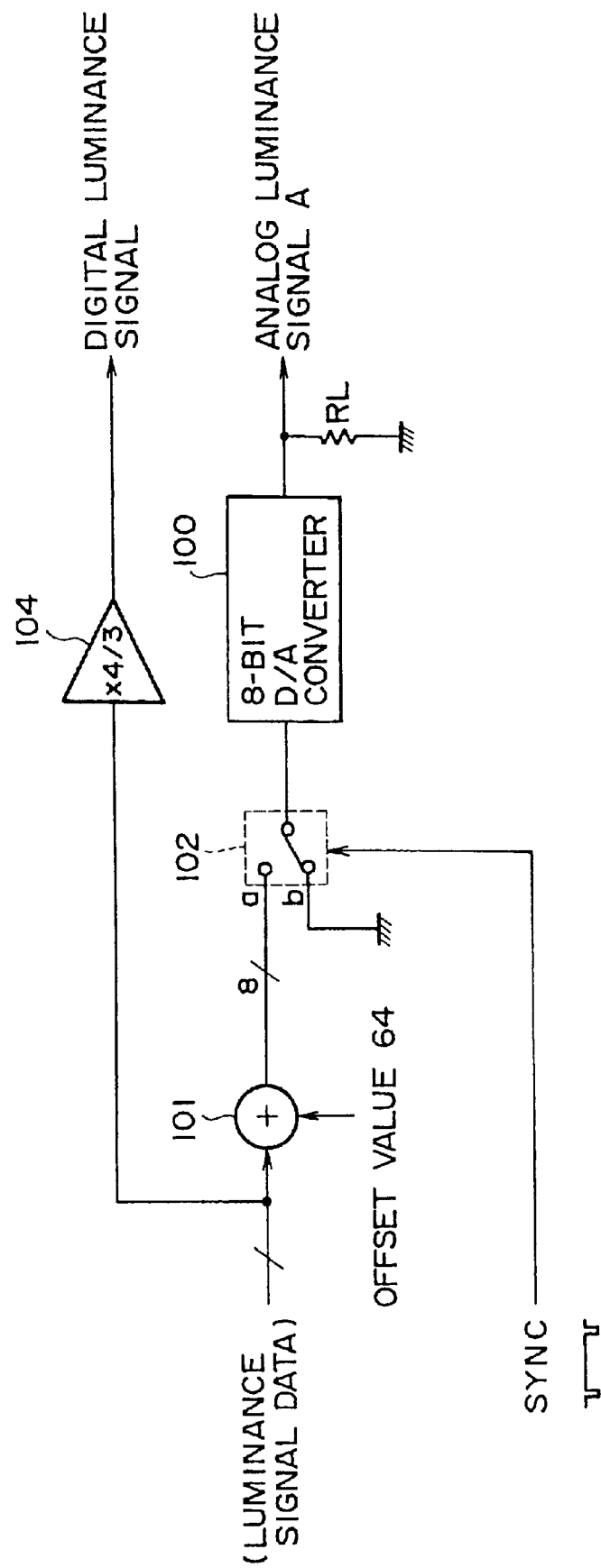
FIG. 6 is a diagram showing the conventional 8-bit D/A converter and a peripheral circuit thereof.

In addition, since it is not necessary to add the synchronization signal Sync to the luminance signal data $D_7$ to $D_0$ supplied to the 8-bit D/A converter 1, unlike the conventional D/A converter shown in FIG. 6, the adder 101 and the selector 102 serving as a peripheral circuit for adding the synchronization signal Sync to the luminance signal data $D_7$ to $D_0$ can be eliminated.

On the top of that, since the luminance signal data $D_7$ to $D_0$ can have a digital value at a full scale in the range 0 to 255, the digital luminance signal data $D_7$ to $D_0$ can be supplied directly to other equipment, offering a merit that the multiplier 104 shown in FIG. 6 can also be eliminated as well.

Next, operations to output a current conforming to the PAL system are explained as follows. In order to output a current conforming to the PAL system, it is necessary to set the level $V_S$ of the synchronization signal added to the analog luminance signal A at 43 IRE which is higher by 3 IRE than the level $V_S$ of the synchronization signal for the NTSC system.

In this case, the mode signal Mode is set at the "high" level. In this way, the AND circuit 10 outputs a signal also at the "high" level to the third current supply 4 except during the pulse periods of the synchronization signal Sync.

That is to say, the third current supply 4 outputs a current $I_3$ for making the level $V_S$ of the synchronization signal of the analog luminance signal A conform to the PAL system. To be more specific, since the level $V_S$ of the synchronization signal added to the analog luminance signal A for the PAL system is higher by 3 IRE than the level $V_S$ of the synchronization signal for the NTSC system, the third current supply 4 needs to output a current $I_3$ corresponding to the difference 3 IRE.

Since the current $I_2$ output by the second current supply 3 is set to produce the level of the synchronization signal at 40 IRE as described above, by setting the ratio of the current $I_2$ to the current $I_3$ at 1:0.075, the level $V_S$ of the synchronization signal in the analog luminance signal A can be set at 43 IRE.

As described above, in the 8-bit D/A converter 1 implemented by the present embodiment, the third current supply 4 is controlled by a signal output by the AND circuit 10 in dependence upon whether the television adopts the NTSC or PAL system. The signal output by the AND circuit 10 is in turn controlled by setting the mode signal Mode supplied to the AND circuit 10 to the "high" or "low" level. By controlling the third current supply 4 in this way, it is possible to output an analog luminance signal A conforming to the NTSC or PAL system. By the same token, the 8-bit D/A converter 1 can also be adapted to the video signal of the SECAM system with ease.

Figure 4:
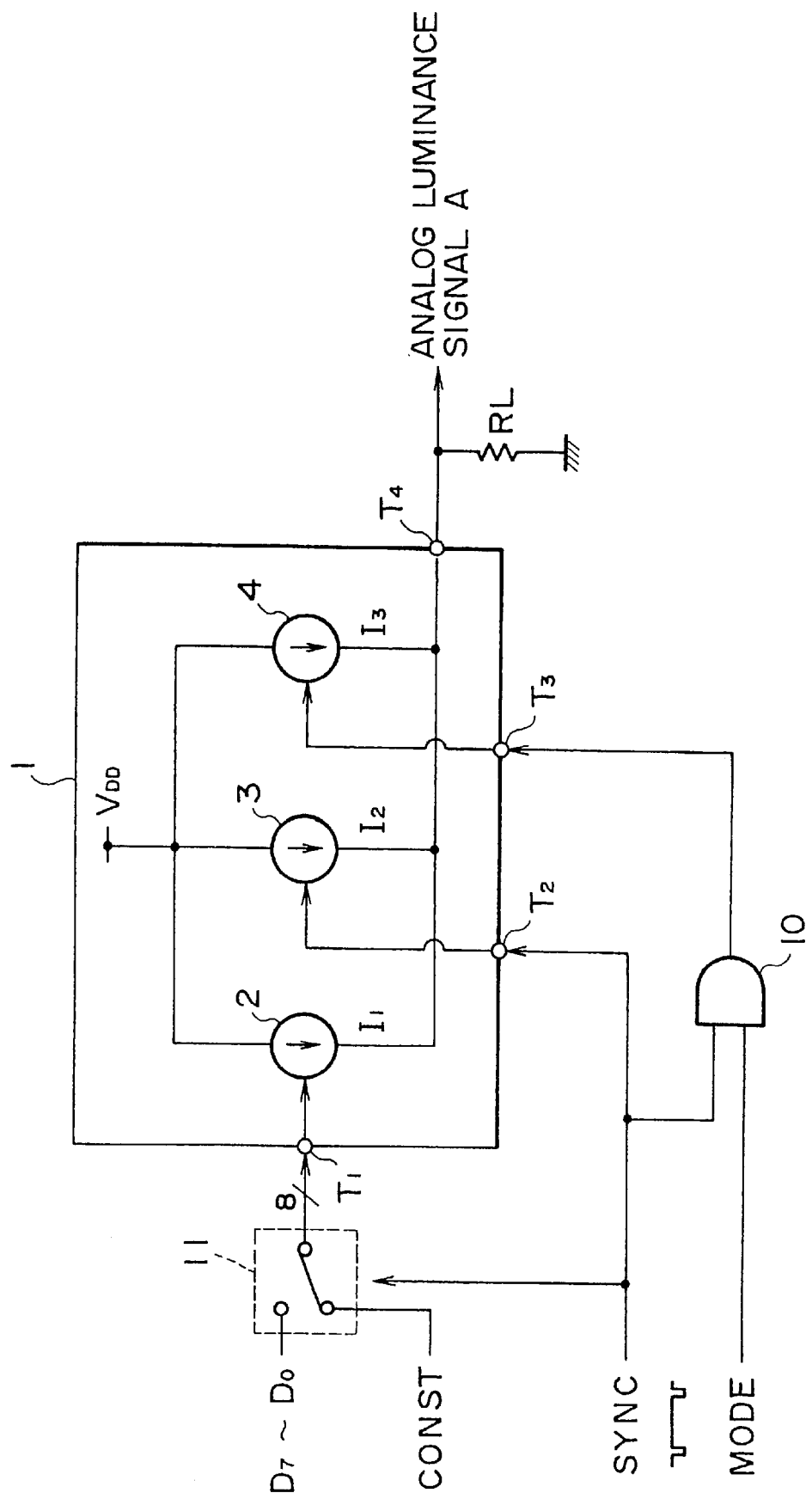
FIG. 4 is a diagram showing an 8-bit D/A converter and a peripheral circuit thereof as implemented by a second embodiment of the present invention.

FIG. 4 is a block diagram showing an 8-bit D/A converter as implemented by a second embodiment of the present invention. It should be noted that each component shown in FIG. 4 identical with that shown in FIG. 3 is denoted by the same reference numeral as that of FIG. 3.

As shown in FIG. 4, a selector circuit 11 is provided on the input side of the 8-bit D/A converter 1. The selector circuit 11 is controlled by timing periods of the synchronization signal Sync. Digital luminance signal data $D_7$ to $D_0$ is supplied to one of the inputs of the selector circuit 11 and fixed digital data Const having a desired value is supplied to the other input thereof.

The selector circuit 11 is controlled so that, during pulse periods of the synchronization signal Sync, the selector circuit 11 supplies the digital data Const to the first current supply 2 of the 8-bit D/A converter 1 but, during periods with no synchronization-signal pulse, the digital luminance signal data $D_7$ to $D_0$ is supplied to the first current supply 2. That is to say, during pulse periods of the synchronization signal Sync, a fixed current representing the digital data Const is output by the first current supply 2.

Figure 5:
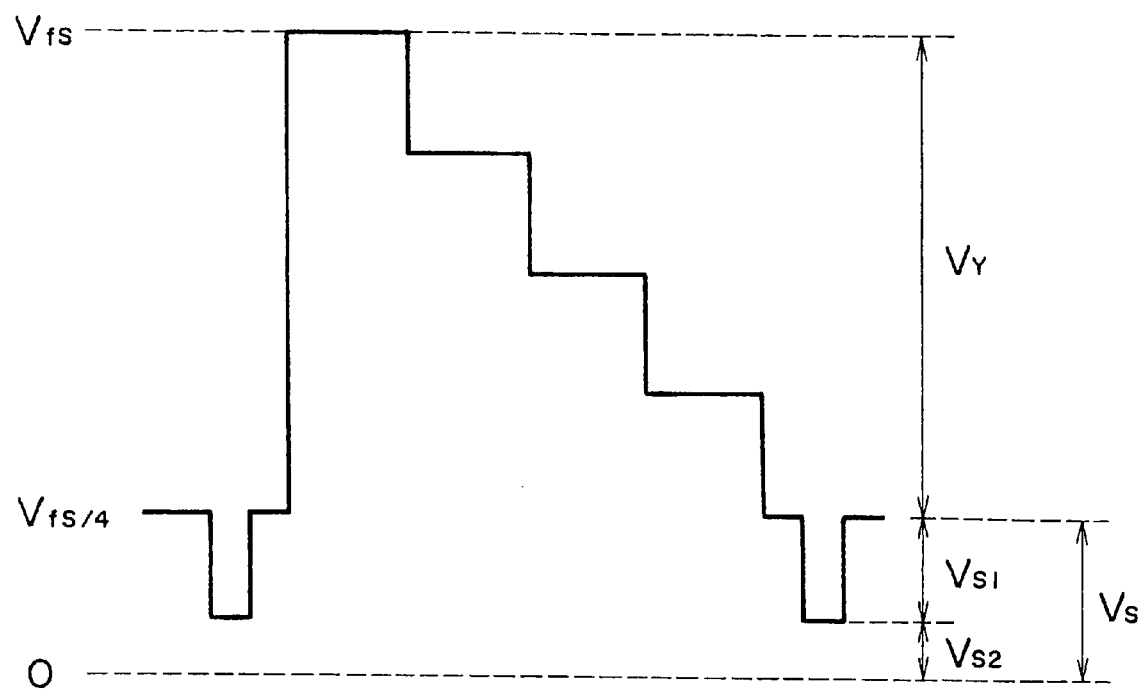
FIG. 5 is a diagram showing an analog luminance signal output by the 8-bit D/A converter implemented by the second embodiment of the present invention.

As a result, the level of the synchronization signal of the analog luminance signal A output by the 8-bit D/A converter 1 is lowered from $V_S$ to $V_{S1}$ by a voltage level $V_{S2}$ corresponding to the fixed current representing the digital data Const as shown in FIG. 5

When the tone level of the luminance signal is in the range 0 to 255 as shown in FIG. 5, for example, the difference $V_{S2}$ in synchronization signal voltage level is expressed by the following equation:

$$V_{S2} = D_C/255 \times I_1 \times R \quad (4)$$

where notation $D_C$ is the value of the digital data Const, notation $I_1$ is the maximum current output by the first current supply 2 and notation R is the resistance of the resistor RL.

That is to say, in the 8-bit D/A converter 1 implemented by the second embodiment with the configuration described above, during pulse periods of the synchronization signal Sync, the selector circuit 11 supplies the digital data Const with a value $D_C$ to the first current supply 2 of the 8-bit D/A converter 1. Thus, by changing the value $D_C$ of the digital data Const supplied to the selector circuit 11, the ratio of the level of the video signal to the level of the synchronization signal of the analog luminance signal A can be varied, allowing an analog luminance signal conforming to a television system other than the PAL and NTSC systems to be output.

It should be noted that, while the present invention has been described with reference to the first and second illustrative embodiments each implementing an 8-bit D/A converter, the description is not intended to be construed in a limiting sense. That is to say, it is to be understood that the subject matter encompassed by the present invention is not limited to the two embodiments. For example, it is needless to say that the present invention can be applied to a D/A converter with a different code length.

In addition, each of the current supplies can comprise a plurality of transistors for outputting a predetermined current. As an alternative, the bias currents of the transistors can also be controlled in order to output a predetermined current.

As described above, since the D/A converter provided by the present invention comprises a first current supply for outputting a current representing input digital luminance signal data and a second current supply turned on and off by a synchronization signal to output a predetermined current, the entire dynamic range of the D/A converter can be allocated to the input digital luminance signal data, allowing the tone expression of an analog luminance signal output by the D/A converter to be improved.

In addition, the D/A converter provided by the present invention also offers a merit that the adder, the selector circuit and the multiplier which are used as a peripheral circuit in the conventional D/A converter can be eliminated.

On the top of that, by providing a third current supply which is used for outputting a predetermined current except during pulse periods of the synchronization signal as requested by a mode signal supplied to the third current supply, it is possible to produce an analog luminance signal conforming to the PAL system.

Furthermore, by adding predetermined offset data during pulse periods of the synchronization signal, the synchronization signal added to the output analog luminance signal can be changed to a desired level.

The above and other objects, features as well as many of attendant advantages of the present invention will be more appreciated as the same becomes better understood by reference to the following figures showing the embodiments of the present invention.

What is claimed is:

1. A D/A converter comprising:
    a first current supply for outputting a current representing input digital video signal data;
    a second current supply for outputting a predetermined current and suppressing said predetermined current during pulse periods of a synchronization signal supplied along with said digital video signal data; and
    wherein the sum of said current generated by said first current supply and said predetermined current generated by said second current supply is output.

2. A D/A converter according to claim 1 wherein a ratio of a maximum current output by said first current supply to said predetermined current output by said second current supply is set at 3:1.

3. A D/A converter according to claim 1 further comprising a third current supply which is used for outputting a predetermined current and suppressing said predetermined current output by said second current supply during pulse periods of said synchronization signal in accordance with an input mode signal.

4. A D/A converter according to claim 3 wherein a ratio of said predetermined current output by said third current supply to said predetermined current output by said second current supply is set at 0.075:1.

5. A D/A converter according to claim 1 wherein a desired direct-current offset data is added to said digital video signal data during said pulse periods of said synchronization signal.

* * * * *